United States Patent [19]

Jensen

[11] Patent Number: 4,519,657

[45] Date of Patent: May 28, 1985

[54] MULTIPLE SERVICE UNIT

[75] Inventor: Henning Jensen, Surfers Paradise, Australia

[73] Assignee: Common Sense Products Pty. Ltd., Surfers Paradise, Australia

[21] Appl. No.: 309,886

[22] PCT Filed: Feb. 19, 1981

[86] PCT No.: PCT/AU81/00019

§ 371 Date: Oct. 6, 1981

§ 102(e) Date: Oct. 6, 1981

[87] PCT Pub. No.: WO81/02495

PCT Pub. Date: Sep. 3, 1981

Related U.S. Application Data

[63] Continuation-in-part of Ser. No. 204,830, Nov. 7, 1980, abandoned.

[30] Foreign Application Priority Data

Feb. 19, 1980 [AU] Australia ............................ PE 2443

[51] Int. Cl.$^3$ .......................................... H01R 13/639
[52] U.S. Cl. ........................................ 339/15; 174/38; 339/39
[58] Field of Search ..................... 339/15, 37; 174/38, 174/39; 52/98-100; 362/96, 62, 431; 137/234, 6

[56] References Cited

U.S. PATENT DOCUMENTS

| | | |
|---|---|---|
| Re. 26,995 | 12/1970 | Guggemos . |
| Re. 27,400 | 6/1972 | Nickola . |
| D. 51,453 | 11/1917 | Black et al. . |
| D. 206,801 | 1/1967 | Bickford . |
| D. 208,307 | 8/1967 | Weber et al. . |
| D. 210,377 | 3/1968 | Lopez-Fabrega . |
| 1,399,355 | 12/1921 | Loveland et al. . |
| 1,586,465 | 5/1926 | Perdue . |
| 1,601,200 | 9/1926 | Davis . |
| 1,603,444 | 10/1926 | Bissell . |
| 1,604,380 | 10/1926 | Boyce . |
| 1,699,097 | 1/1929 | Cravey et al. . |
| 1,867,602 | 7/1932 | Stukenborg . |
| 1,962,915 | 6/1934 | Sharp . |
| 2,735,088 | 2/1956 | Kinzer . |
| 3,048,833 | 8/1962 | Bernheim ..................... 362/431 X |
| 3,059,102 | 10/1962 | Sherron . |
| 3,139,215 | 6/1964 | Sasnett . |
| 3,145,934 | 8/1964 | Guggemos . |
| 3,242,252 | 3/1966 | Bergenstein . |
| 3,257,496 | 6/1966 | Hamilton ........................ 174/38 |
| 3,293,588 | 12/1966 | Blonder ............................ 339/37 |
| 3,300,570 | 1/1967 | Spiece et al. . |
| 3,450,951 | 6/1969 | Boyle . |
| 3,621,869 | 11/1971 | Albarran . |
| 3,653,401 | 4/1972 | Beeter . |
| 3,683,350 | 8/1972 | Shedenhelm . |
| 3,691,288 | 9/1972 | Sturdivan . |
| 3,753,049 | 8/1973 | Plummer . |
| 3,761,780 | 9/1973 | Plummer ..................... 174/38 X |
| 3,800,063 | 3/1974 | DiMaggio et al. . |
| 3,891,899 | 6/1975 | Sparling ..................... 174/38 X |
| 4,007,564 | 2/1977 | Chisholm ........................ 52/98 |
| 4,133,021 | 1/1979 | King et al. ................. 174/38 X |
| 4,200,904 | 4/1980 | Doan . |
| 4,302,799 | 11/1981 | Behrens . |

FOREIGN PATENT DOCUMENTS 2830876 10/1979 Fed. Rep. of Germany .......... 52/98

Primary Examiner—Eugene F. Desmond
Attorney, Agent, or Firm—Murray, Whisenhunt and Ferguson

[57] ABSTRACT

A service unit comprising a frangible mounting means and a hollow body adapted to be mounted on a supporting surface by the mounting means. Mounted within the hollow body are power distribution means, and power metering means, and at least one lighting means. The hollow body is provided with a plurality of apertures with releasably securable covers. Water, telephone and other service equipment can also be mounted within or attached to the body to provide the desired service capabilities.

15 Claims, 17 Drawing Figures

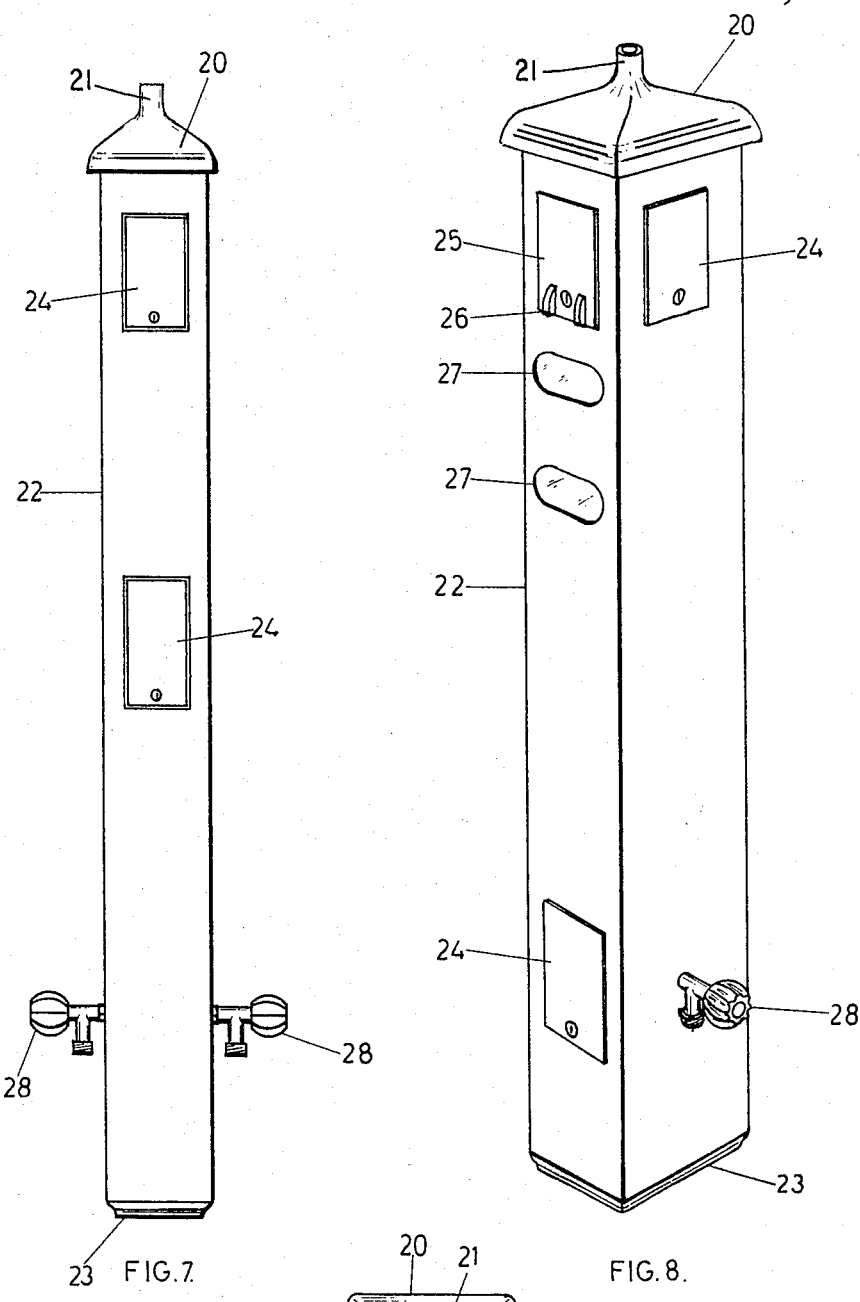

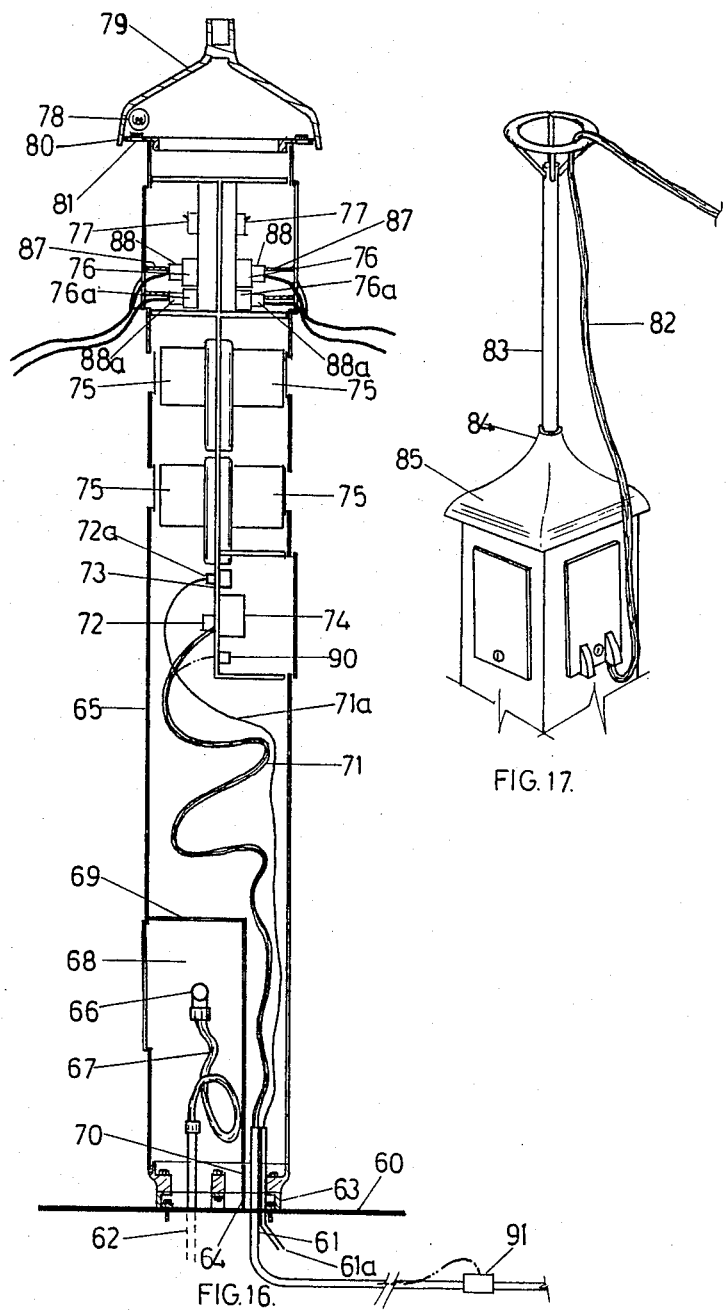

MULTIPLE SERVICE UNIT

CROSS-REFERENCE TO RELATED APPLICATION

This application is a continuation-in-part of my earlier application, Ser. No. 204,830, filed Nov. 7, 1980, now abandoned.

This invention relates to a multi-functional service unit for trailer parks, camping areas, marinas, jetties, wharves and like installations as well as building sites.

In such trailer parks, marinas, building sites and the like, essential services comprising water, electrical power and lighting are frequently provided as separate systems. The resultant combination of hoses, pipes, cable and supports is inconvenient in use, expensive to install and maintain and is usually unsightly in appearance. In order to alleviate such problems, it has previously been proposed to provide a service unit comprising a number of electrical power outlets and a power consumption meter in a single box or separate boxes on a support pole. Electrical wiring may be provided to the boxes via a conduit attached to the exterior of the pole or via the hollow space within a tubular pole. A water pipe with tap affixed may also be attached to the exterior of the support pole if required. In one type of prior art service unit, a power outlet box, a meter box, a water pipe and appropriate connecting conduits are integrally cast within a shaped concrete structure.

Of the prior art service units previously available most have been designed to suit a particular location in a campsite, trailer park, building site etc. and to provide a very limited number of services. Such service units are usually expensive to install and extremely difficult to maintain. Apart from the possibility of mounting additional boxes to the post-mounted service unit, none of the prior art units has contemplated a device which combines the features of ease of installation, ease of maintenance and the flexibility to accommodate a wide range of service functions within a simple, inexpensive and aesthetically acceptable structure.

A further difficulty associated with the prior art service unit installations is that normally only three power outlets are permitted on one power circuit, with the fuses located at a main switchboard centre remote from the service unit. This makes it very difficult to locate the correct fuse for a faulty power outlet. In addition, it is difficult to provide effective safety circuits for such outlets e.g. if the electrical insulation is damaged or water enters the outlet. Similarly, all the lights for a campsite, trailer park, marina, building site or the like normally share a common fuse, so that in the case of a single power circuit fault, or if the fuse blows, the whole area is blacked out until the faulty circuit or fuse is repaired.

A number of further difficulties appear to have been inherent in prior art service units in that they are prone to damage by vandals or by impact from vehicles or marine vessels. Many of the prior art devices have exposed power meters, switches, power distribution outlets and lights which may be easily damaged by vandals and many have exposed mounting bolts, screws and the like which permit unauthorized tampering. A particular disadvantage associated with prior art units is the manner in which they are mounted to a ground surface, jetty, marina pontoon or the like. Most devices are rigidly mounted to a base by bolting or by casting in a concrete base. In the event that a vehicle or marine vessel accidentally contacts such a rigidly mounted service unit, the unit itself may be severely damaged or if mounted on a jetty or marina pontoon, the jetty or pontoon may suffer damage of a most expensive nature. As in most prior art units, the power and water conduits are rigidly mounted to the service unit, impact damage by a vessel or vehicle may cause the power and water supply conduits to be severed thus creating a grossly unsafe condition.

The present invention has been conceived with the aim of alleviating the abovementioned problems and to provide a simple, inexpensive and aesthetically acceptable service unit, capable of providing a wide range of services and at the same time providing an easily maintainable unit suitable to any location requiring a service unit of this type. A particular advantage of service units according to the invention is that access to power distribution outlets and other services may be strictly controlled by the provision of lockable covers. The covers serve a dual function in that not only do they prevent unauthorized consumption of services provided, but the covers may also be adapted to prevent accidental or deliberate disconnection or removal of service connections such as power leads, telephone cables etc. To this end the lockable covers may be provided with apertures, preferably on the lower peripheral edge, the apertures being dimensioned such as to permit the cover to be locked while the service leads, cords, cables etc. are connected to the service unit. Additionally, the inner face of the lockable covers may be adapted to engage the plugs of the service connections such that when the cover is locked it is not possible to remove the plug from its corresponding socket by applying tension to the service lead, cord, cable etc.

According to the invention there is provided a service unit comprising:
   a hollow body adapted to be mountable on a surface by said mounting means;
   power distribution means; and;
   power metering means,
      said hollow body being provided with a plurality of apertures with releasably securable covers.

Preferably the releasably securable covers are adapted to prevent, in use, removal or disconnection of a service connection.

Preferably the service unit comprises frangible mounting means.

Preferably the frangible mounting means comprises an essentially hollow, walled mounting base with inwardly extending mounting lugs adjacent its upper edges. Some of the lugs may be adapted for connection to corresponding mounting lugs or a mounting plate formed in the base portion of the body and additional lugs are provided for mounting the service unit to a base. Certain of the lugs are adapted by dimension, to preferentially fracture in the event of impact. The frangible base may also be provided with a plurality of apertures to permit ingress of ventilating air or egress of water in the event of flooding. Alternatively, the frangible mounting means may comprise frangible mounting bolts or the like. Such bolts may be formed from relatively low tensile materials, for example nylon, aluminum, brass or like materials.

Preferably, the service unit is provided with a plurality of power metering means and power distribution outlets to provide independent service to a plurality of users.

Each power distribution outlet may be connected to a separate circuit comprising a power consumption meter, a circuit breaker and an indicator means to indicate a tripped circuit breaker.

Preferably the lighting means comprises an incandescent or fluorescent light mounted adjacent the upper part of the body. Depending on the location of the service unit, i.e. at a campsite, trailer park, marina, wharf, jetty or the like, the lighting means may be provided with a suitable diffuser means or reflector means.

Preferably the lighting means is provided in the top or cap portion of the service unit and is adapted to provide downwardly directed diffuse light about all or a portion of the service unit. The lighting means may also be adapted to provide interior lighting for the service unit. Additionally or alternatively, the lighting means may comprise an exterior light mounted atop the service unit.

Site identification means such as an illuminated number or other indiciae may also be incorporated in the exterior light diffuser as well as appropriately coloured segments for night-time marine navigation purposes if applicable.

The lighting means may additionally or alternatively comprise a "foot-light" mounted adjacent the lower part of the body and may be downwardly directed by, for example, mounting the light behind a louvred cover plate. The lighting means of the service unit is preferably connected in a circuit with a circuit breaker and an indicator to indicate a tripped circuit breaker. In an alternative embodiment of the invention, the lighting means may be actuable by a light-sensitive switching means.

In a most preferred arrangement, the lighting means is mounted within the top or cap portion of the service unit, the top or cap portion being adapted to extend beyond the walls of the unit to form an outwardly extending rim. The rim may act as a protective cover for the lighting means and permit the light to be directed downwardly as required.

Apertures are arranged in the body to permit ease of installation of the various service components and also to permit ease of access for maintenance purposes. The aperture covers may be releasably secured to the body by any suitable means such as screws, bolts or the like and are preferably of the type which discourage unauthorized tampering or removal.

Preferably, the service components are mounted on a frame which may be withdrawn from the top of the service unit to permit replacement or maintenance of the service components.

The body of the service unit may be constructed from any suitable material, preferably of a non-corrosive and generally maintenance free material such as aluminum, plastics etc.

The body may for example be fabricated from sheet material, cast, moulded or extruded to the required shape and dimensions. Suitable materials for forming the body may comprise aluminum and its alloys, polyethylene, polypropylene, polybutylene, nylon, rigid PVC, polyesters, epoxies, polyurethanes and the like or fibreglass reinforced synthetic resins.

The aperture covers may be formed from the same material as the body of the service unit, or if appropriate may comprise a transparent material such as glass or acrylic compounds to permit visual inspection of electric power meters to determine power consumption or to permit inspection of other service components for maintenance purposes.

Most preferably the body may be formed from cast aluminum or moulded plastics material and comprises a cap portion, a walled portion and a base portion. The cap, wall and base portions may be suitably connected by welding, gluing, rivetting, bolting, screwing etc.

A wide range of additional services may be connected to the service unit according to the invention. Such additional services may include:
  telephone;
  communications antennae connections of various impedances;
  battery charging facilities of various voltages e.g. 6 V, 12 V, 24 V, 32 V;
  intercom;
  piped music, news, weather reports;
  an air blower adapted on an outlet side to provide via a suitable hose or conduit a source of heated air for use in cold climates to heat tents, trailers, boats vehicle engines etc. and optionally adapted to provide on an inlet side air suction suitable for vacuum cleaning purposes;
  fire extinguisher;
  fire hoses (connected, if desired to a source of water, $CO_2$, foam etc.).

Preferably, one or more aperture covers is hingedly mounted on the body and secured by a key-operated locking means. Such lockable covers, are weatherproof and are preferably provided to permit authorized access to the service outlet connections and/or to permit access to components for maintenance purposes.

To enable the invention to be fully understood, various embodiments of the invention will now be described with reference to the accompanying drawings in which:

FIGS. 4–9 illustrate a left elevation, front elevation, right elevation, rear elevation, front perspective and top plan views respectively of a most preferred embodiment of the invention.

FIG. 16 is a cross-sectional view of one embodiment of the invention embracing the features of FIGS. 4–15.

FIG. 17 illustrates a modified form of the invention incorporating a support standard for a power distribution lead.

Figure 1:
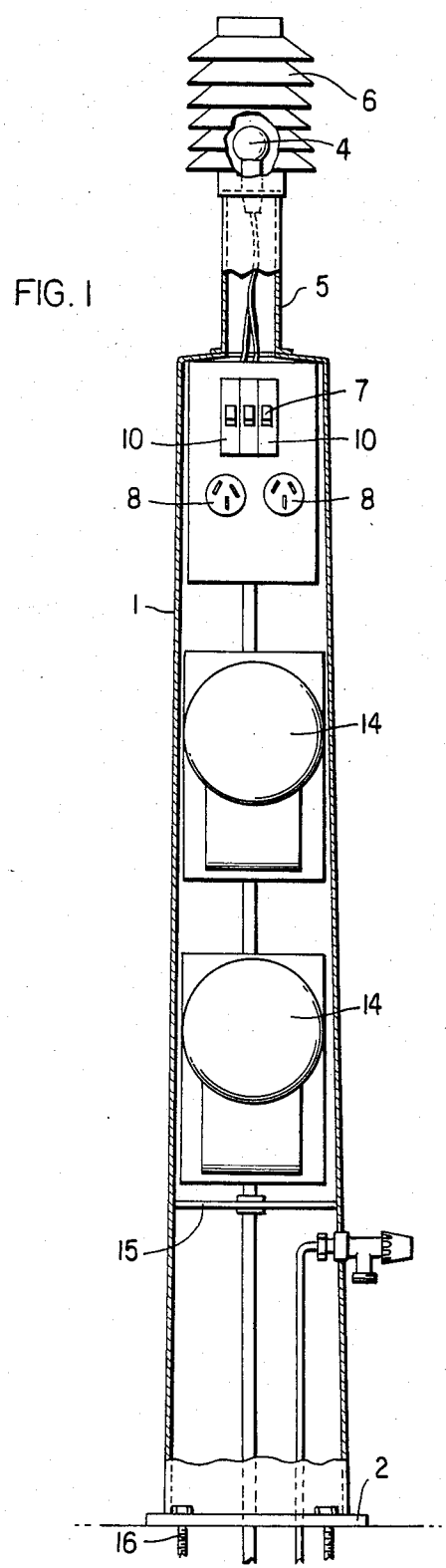
FIGS. 1–3 show a front interior view, side interior view and a front external view respectively of a simplified form of a service unit suitable for two service consumers.
Figure 2:
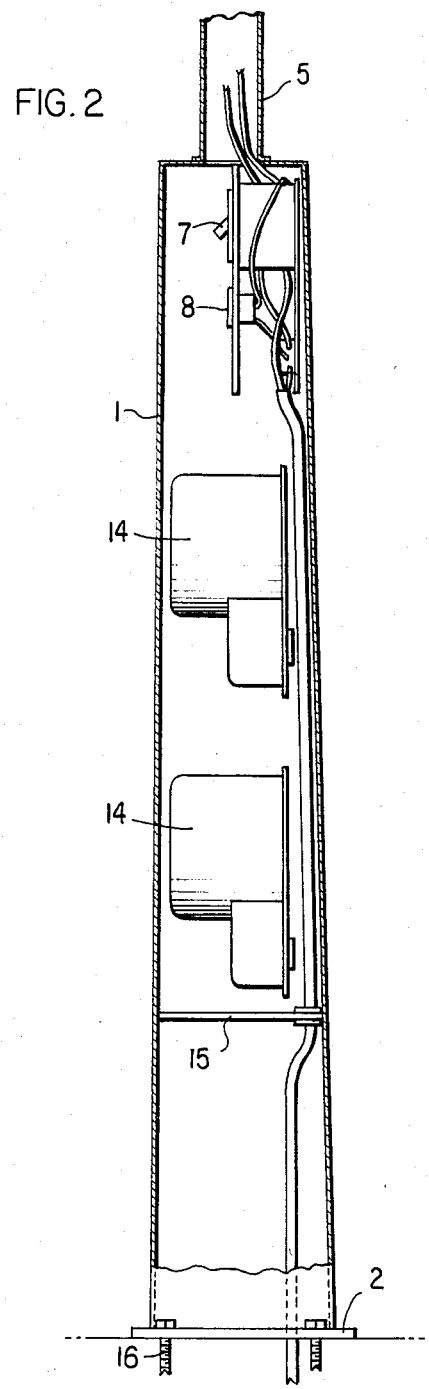
Figure 3:
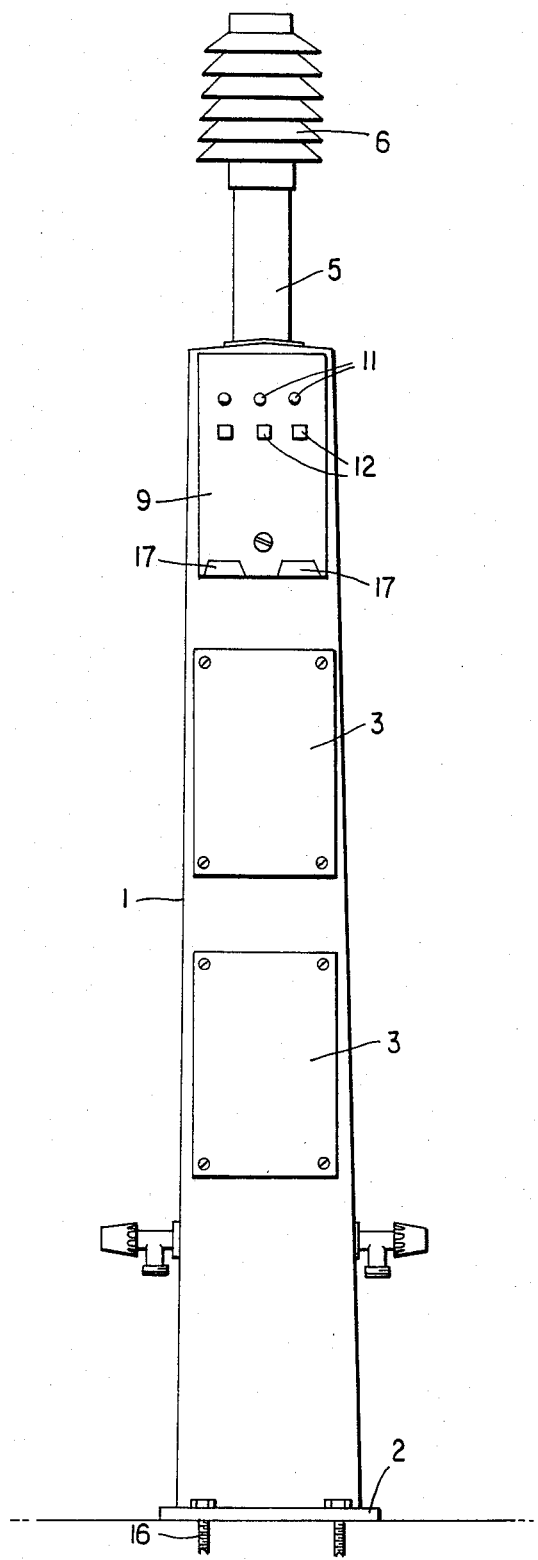
Figure 4:
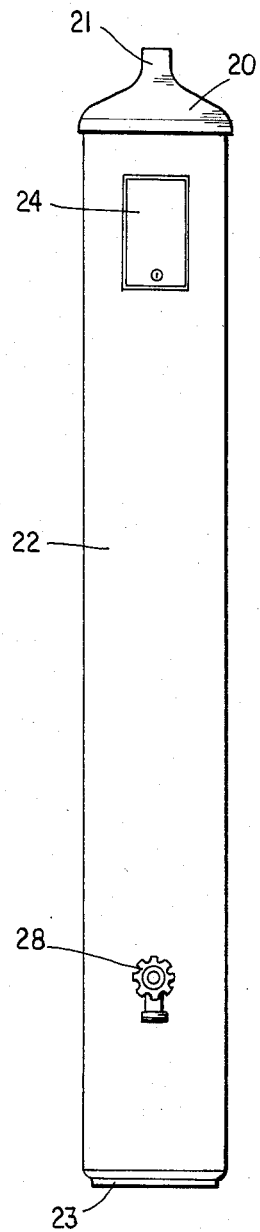

In FIGS. 1–3 the unit has a substantially rectangular hollow body 1 cast from a corrosion resistant aluminum alloy. The body 1 has an integrally cast base 2 which can be bolted directly to a jetty, wharf, etc. or to a cast concrete base set in the ground. The bolts 16 are preferably frangible and may be chosen from low tensile materials such as nylon, aluminum, brass etc.

The upper portion of the body 1 is provided with removable access covers 3 to enable access to the service components inside the body 1.

A light 4 is mounted on a standard 5 on the top of the body 1 and is surrounded by a translucent "Japanese Lantern" style light diffuser 6. A circuit breaker 7 is wired in the electrical circuit of the light and is provided inside the body, access for wiring and installation being gained via an access cover 3 at the rear of body 1 as shown in FIG. 3.

A.C. power outlets 8 are provided within the body 1 and are accessed via lockable hinged access cover 9. The lower portion of the lockable cover 9 is provided with apertures 17 which are dimensioned so as to prevent withdrawal or removal of the service connection cord and plug when the cover is locked. The power outlets 8 are connected in circuit with circuit breakers 10 mounted internally of the body 1. Each outlet is provided with a key-operable switch (not shown). Should any of the circuit breakers be tripped, indicator lights 11 mounted on cover 9 are illuminated to indicate a fault. Reset buttons 12 are provided in cover 9 to permit resetting of the circuit breakers. Watt hour meters 14 are connected in circuit with power outlets 8 to measure individual power consumption from each outlet. Access covers 3 are provided adjacent the meters 14 in the front and back faces of body 1 to permit ease of installation and maintenance. The front access covers are made from glass or transparent acrylic plastics sheet to permit reading of the meters 14.

Water taps 13 are provided on the side walls, each having outlets to enable connection to water hoses. (A single tap is shown in FIG. 1 and none in FIG. 2 for the purpose of clarity).

An access cover 3 shown in FIG. 3 is provided in the rear wall of body 1 to enable access to the water pipes. The plumbing functions of the service unit are isolated from the electrical functions by a baffle plate 15 to prevent ingress of water. Louvres in a lower access cover enable an internal light (not shown) in the body 1 to provide lighting for pedestrians near the service unit.

In a modified form of the unit, additional services such as telephone, intercom, communications antennae may be provided by additional sockets in body 1 behind access cover 9 and/or a built-in intercom speaker and controls may be provided in the front wall of the body and are protected by a lockable weatherproof cover.

LNG, LPG or town gas may also be provided via a metering device and suitable connections.

In an alternative embodiment of the invention, the consumption meters for various services such as AC power, DC battery charging, gas etc. may be substituted by coin-operated metering devices.

The outlet of a battery charger mounted in the body 1 may also be protected by a lockable weatherproof cover.

A fire extinguisher and/or a retractable fire hose reel can be mounted on the side walls of or within the body 1 to be readily available in any outbreak of fire.

Hooks for the storage of hoses or other items can also be provided on the side walls of the housing and a lockable storage cabinet can also be provided within body 1. Other services, if required, can readily be provided either externally or internally of the unit.

Figure 5:
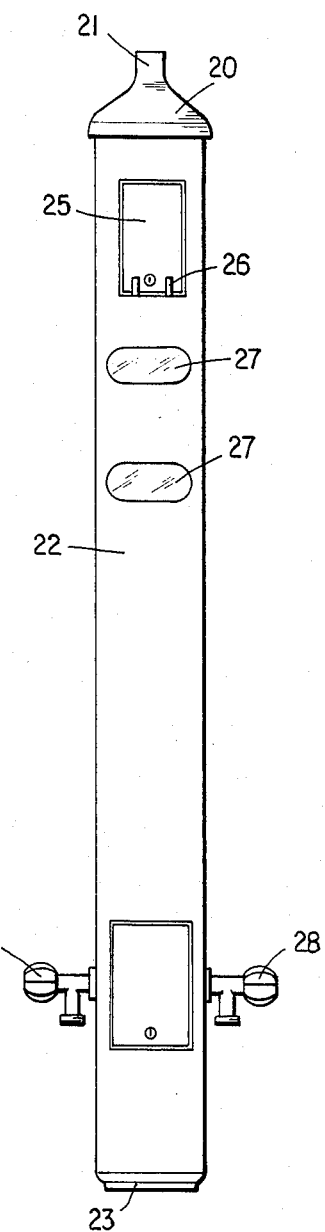
Figure 6:
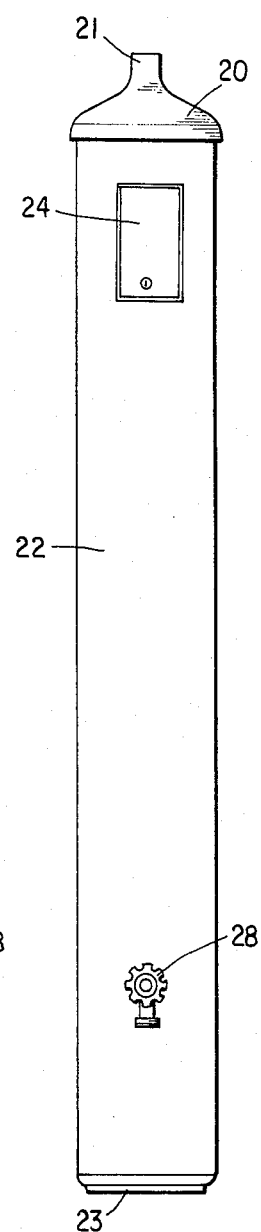

FIGS. 4–9 illustrate the external features of a most preferred embodiment of the invention which comprises a cap portion which may be suitably formed from cast aluminum or moulded plastics material. A socket 21 is provided to permit mounting of a lighting means or a standard to support a lighting means or other device if required. Body 22 is preferably formed from aluminum or moulded plastics material. A base portion 23 may also be suitably cast from aluminum or moulded in plastics material and the entire assembly comprising cap, body and base portion may be joined by welding, gluing, rivetting, bolting, screwing etc. Lockable access covers 24 may be suitably located in the body 22 for access to the interior thereof. Lockable access cover 25 (illustrated in FIGS. 5 and 8) which provides access to power or other service distribution means is preferably provided with "hooded" apertures 26 to permit power leads or other service leads to be connected to the distribution means and secured by locking access cover 25. Covers 24 and 25 may be attached to body 22 by suitable hinges and preferably permit weatherproof closure. Faucets 28 may be attached to the service unit to provide a source of water. FIGS. 5 and 8 illustrate transparent covers 27 to permit reading of power meters mounted within the service unit.

Figure 10:
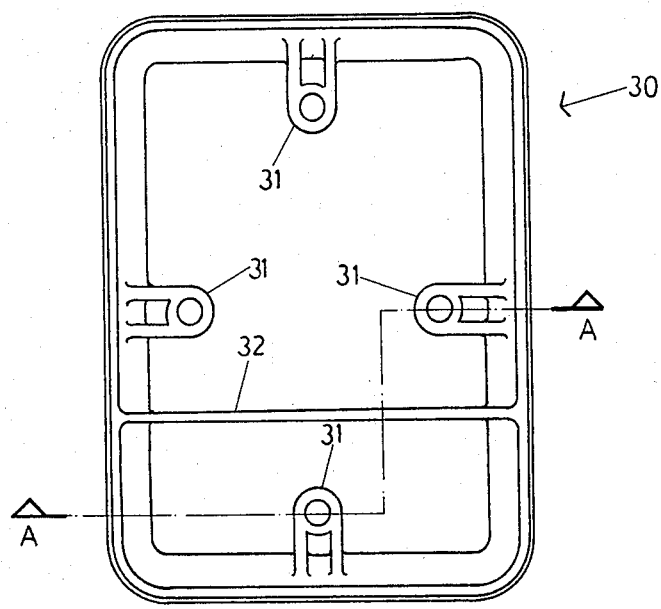
FIG. 10 is a top plan view of a base portion of the body of a most preferred embodiment.

FIG. 10 illustrates a cast base portion 30 incorporating mounting lugs 31 and a separating flange 32, the purpose of which will be described later.

Figure 11:
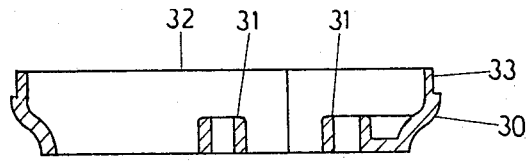
FIG. 11 is a cross-sectional view of the base portion of FIG. 10 along the line A—A.

FIG. 11 illustrates a cross-section of the base portion of FIG. 10 along the line A—A. A stepped rim 33 is provided to engage with the body of the service unit.

Figure 12:
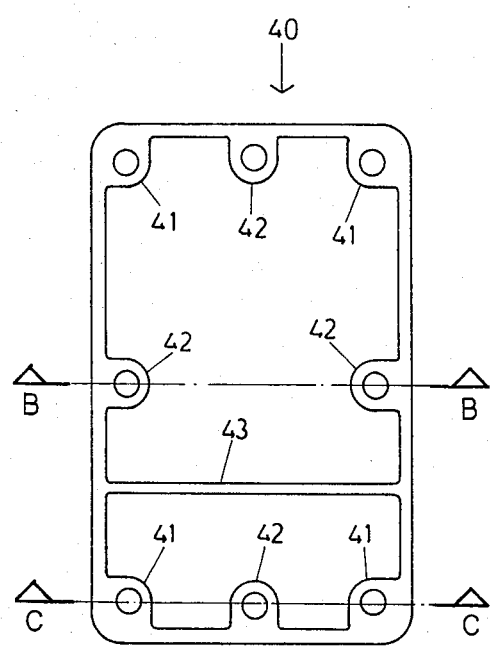
FIG. 12 is a top plan view of one embodiment of a frangible base according to the invention.

FIG. 12 illustrates one embodiment of a frangible base according to the invention. The base 40 is preferably cast in aluminum and includes lugs 41 for mounting to a supporting surface. Frangible lugs 42 are provided to correspond with the base portion of the service unit to permit mounting thereto. The lugs are suitably dimensioned to permit breakage from the base 40 when a service unit mounted thereto is subjected to impact but the lugs are sufficiently sturdy to otherwise support the service unit for normal use.

A separating flange 43 is provided to correspond with flange 32 of base portion 30 in FIG. 10.

Figure 13:
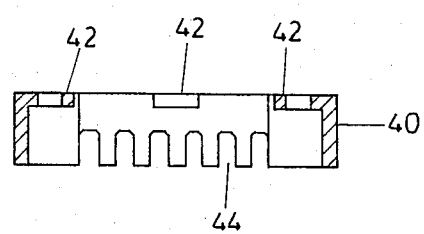
FIGS. 13 and 14 are cross-sectional views of the base of FIG. 12 along the lines B—B and C—C respectively.
Figure 14:
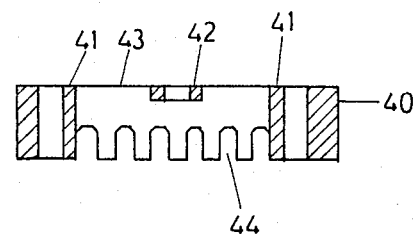

FIGS. 13 and 14 illustrate cross-sections along the lines B—B and C—C respectively of FIG. 12. Apertures 44 may be provided about the lower periphery of base 40 as well as the lower part of flange 43 to permit ingress of ventilating air and/or egress of water in the event of flooding.

Figure 15:
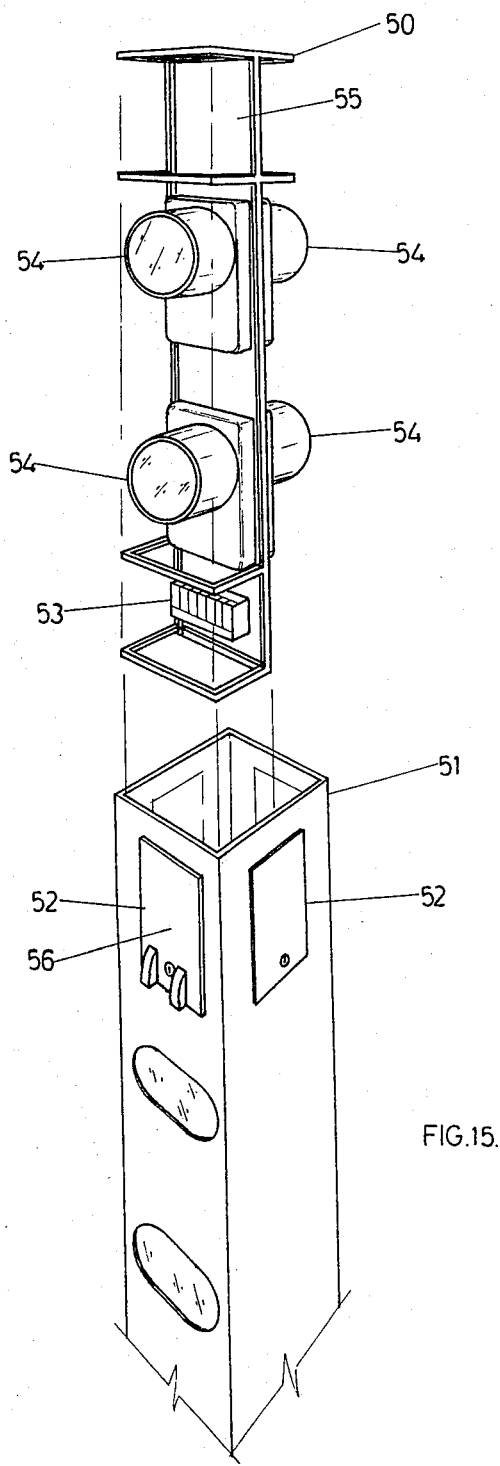
FIG. 15 illustrates a removable frame according to another embodiment of the invention.

FIG. 15 illustrates a further embodiment of the invention wherein certain of the service components, particularly the electrical components are mounted on a removable frame which is adapted to be secured within the body 51 by for example screws mounted in flanges (not shown) about the inner periphery of the access apertures 52. Components such as circuit breakers 53, power meters 54 and other components (not shown) may be suitably arranged on the frame to suit the particular requirements of the service unit. Only certain of the components have been illustrated for the sake of simplicity but it will be readily obvious that power distribution sockets, switches, reset devices, etc. would be mounted in the region 55 to correspond with access cover 56. A junction box (not shown) may be provided for example at the rear of the circuit breakers 53 for connection of the primary electrical power.

FIG. 16 illustrates a particularly preferred embodiment of a service unit according to the invention and its manner of installation. A base surface 60 which may comprise a cast concrete base set into the ground surface of a campsite or on a jetty, marina pontoon or the like or other suitable surface may be provided with suitably positioned service conduits such as electrical and communications conduit(s) 61 and 61a respectively and/or water conduit 62 extending for a short distance from the surface 60. A frangible base 63 is then mounted for example by bolting to the surface 60 such that the power communications and water conduits are separated by flange 64. A service unit 65, pre-assembled with the required range of services is then bolted to the base 63 via the frangible lugs thereon. Water faucets 66 are then suitably connected via a T-piece and a flexible hose 67 to water conduit 62. Chamber 68 is formed by partition 69, corresponding base portion flange 70 and frangible base flange 64 to isolate the electrical and communications components in the event of a burst water pipe between the faucets 66 and the conduit 62. Excess lengths of power and communications cables 71 are then connected to junction boxes 72 and 72a respectively, mounted on component mounting frame 73. In the embodiment illustrated are circuit breakers 74, power meters 75, power distribution sockets 76, communications sockets 76a and power switches 77. The inward face of lockable covers 86 is provided with abutments 87 which, when covers 86 are locked, engage power plugs 88 and communications plugs 88a to retain them in their respective sockets. A lamp 78 may be mounted within the cap 79 in the peripheral rim portion 80 extending beyond the wall of the service unit body. The lamp may be protected from weather or unauthorized tampering by a transparent or translucent diffuser 81 extending between rim 80 and the unit body. One or more lamps may be provided in the rim portion around the periphery of the body depending on particular requirements. The lamp is positioned to permit simultaneous illumination of the interior of the service unit for in situ maintenance and to permit meter reading.

In the event that a service unit such as that illustrated in FIG. 16 suffers heavy impact from a motor vehicle or a marine vessel, the frangible lugs 42 (shown in FIG. 12) are severed, permitting the service unit to fall on one side suffering little if any damage to the body or the service components contained therein. The flexible water, electrical and communications couplings permit the unit to fall in the manner described without damaging the couplings and permit the unit to continue functioning without interrupting service or creating an unsafe condition due to exposed electrical conductors and gushing water. As a further safety feature, a mercury switch or the like may be fitted to the interior of the service unit and connected to remotely located isolating relay 91. In the event that a service unit is knocked over on impact, the isolating relay is activated to isolate the unit from the main power supply. Restoration of the service unit to its former state is simply and inexpensively achieved by replacing base portion 40 (shown in FIG. 12).

FIG. 17 illustrates an optional feature of the invention whereby a power lead 82 may be supported by a standard 83 in a socket 84 formed in the cap 85 of the service unit. Such a feature would be particularly beneficial in a congested situation where many power and/or other leads are deployed to a number of users in, say, a trailer park or on a work site.

As will be readily apparent, the unit described provides a strong, compact and aesthetically pleasing service unit which can provide a plurality of essential and optional services for one or more consumers at a campsite, trailer park, jetty, marina, wharf or the like or a building site.

It will be apparent to a skilled addressee that various changes and modifications may be made to the embodiment described without departing from the spirit and scope of the present invention.

I claim:

1. A service unit for controlled distribution through individually lockable doors, and for individual metering, of electrical services to a plurality of authorized users comprising:
    a weatherproof hollow body,
    transparent windows in the walls of said hollow body,
    power distribution means for distributing electrical power from a power conduit connected thereto to a plurality of electric power receptacles,
    a plurality of electrical meters for measuring the power consumed through the electrical power receptacles by each authorized user,
    said meters being readable through said windows, said electric power receptacles, said power distribution means, and said electric meters being located entirely within said hollow body,
    a plurality of openings in said hollow body, each opening being associated with at least one electrical power receptacle, each receptacle being accessible through an opening
    lockable access door means for lockably securing each opening so that only authorized users have access through said door to at least one electrical power receptacle located therebehind.

2. A serivce unit as claimed in claim 1 further comprising a support structure inside said hollow body and having said electric power receptacles and said power meters mounted thereon, said support structure, said electric power receptacles and said power meters being removable from within said hollow body by moving said support structure longitudinally within said hollow body and out through the upper end thereof.

3. A service unit as claimed in claim 1, wherein said lockable access door means when locked prevents electrical disconnection of an electrical conduit connected to an electrical power receptacle located behind said door means in said hollow body.

4. A service unit for controlled distribution through individually lockable doors, and for individual metering, of electrical services to a plurality of authorized users comprising,
    a weatherproof hollow body,
    transparent windows in the walls of said hollow body,
    power distribution means for distributing electrical power from a power conduit connected thereto to a plurality of electric power receptacles,
    a plurality of electrical meters for measuring the power consumed through the electrical power receptacles by said authorized user,
    said meters being readable through said windows, said electric power receptacles, said power distribution means, and said electric meters being located entirely within said hollow body,
    a plurality of openings in said hollow body, each opening being associated with at least one electrical power receptacle, each receptacle being accessible through an opening,
    lockable access door means for lockably securing each opening so that only authorized users have access through said door to at least one electrical power receptacle located therebehind, said door means when locked preventing electrical disconnection of an electrical conduit connected to an electric power receptacle located behind said door means, a removable frame located within said hollow body, and at least said electric meters being mounted on said frame and removable therewith.

5. Service unit of any one of claims 1, 2, 3 or 4, wherein said hollow body is mounted on a surface by mounting means which comprises frangible mounting means.

6. Service unit of claim 5, wherein said frangible mounting means comprises a mounting base with frangible lugs.

7. Service unit as claimed in claim 5, wherein said frangible mounting means comprises frangible mounting bolts.

8. Service unit of any one of claims 1, 2, 3 or 4, wherein said lockable access door means includes a key-operated lock.

9. Service unit of any one of claims 1, 2, 3 or 4, wherein a plurality of electric power receptacles are located behind each of said lockable access door means.

10. Service unit of claim 4, wherein said service unit includes cap means for enclosing the top of said hollow body, said cap means being removable from said hollow body, said frame being removable through an opening formed in said hollow body when said cap is removed.

11. A service unit as claimed in any one of claims 1, 2, 3 or 4, further including at least one water outlet tap means mounted on the exterior of said hollow body and connected to a water supply duct extending into said hollow body from an external water supply.

12. A service unit as claimed in any one of claims 1, 2, 3 or 4, further including lighting means mounted within the upper portion of said hollow body for providing light directed essentially downwardly to provide for external illumination and illumination of the interior of said service unit.

13. A service unit as claimed in any one of claims 1, 2, 3 or 4, wherein said unit provides both electrical services and at least one other service selected from the group consisting of telephone service and communications antenna service.

14. A service unit of any one of claims 1, 2, 3 or 4, further including coin-operated means for controlling at least one service distributed through said service unit by the provision of coins to said coin-operated means.

15. A service unit as claimed in any one of claims 1, 2, 3 or 4, further including at least one circuit breaker mounted within said hollow body and electrically connected to at least one of said electric power receptacle means.

* * * * *